United States Patent
Ellis et al.

(10) Patent No.: US 7,980,377 B2
(45) Date of Patent: Jul. 19, 2011

(54) MOUNTING ARRANGEMENT

(75) Inventors: Peter Ellis, Johannesburg (ZA); Melvyn George King, Johannesburg (ZA)

(73) Assignee: Brelko Patents (PTY) Ltd. (ZA)

( * ) Notice: Subject to any disclaimer, the term of this patent is extended or adjusted under 35 U.S.C. 154(b) by 148 days.

(21) Appl. No.: 12/543,954

(22) Filed: Aug. 19, 2009

(65) Prior Publication Data
US 2011/0042186 A1 Feb. 24, 2011

(51) Int. Cl.
*B65G 11/00* (2006.01)

(52) U.S. Cl. ...... 193/2 R; 193/33; 198/836.1; 198/860.3

(58) Field of Classification Search ............ 193/2 R, 193/25 A, 25 E, 33, 2 A; 198/836.1–836.4, 198/860.3, 735.3
See application file for complete search history.

(56) References Cited

U.S. PATENT DOCUMENTS

| | | | | |
|---|---|---|---|---|
| 5,048,669 A * | 9/1991 | Swinderman | | 198/525 |
| 5,129,508 A * | 7/1992 | Shelstad | | 198/860.3 |
| 5,513,743 A * | 5/1996 | Brink | | 198/836.1 |
| 5,601,180 A * | 2/1997 | Steeber et al. | | 198/502.1 |
| 6,279,715 B1 * | 8/2001 | Herren | | 193/33 |
| 7,232,023 B2 * | 6/2007 | Ellis et al. | | 193/2 R |
| 7,637,368 B2 * | 12/2009 | Andreoli | | 198/836.3 |
| 2008/0053785 A1 * | 3/2008 | Neville et al. | | 193/25 R |
| 2010/0072035 A1 * | 3/2010 | Brody et al. | | 198/836.1 |

* cited by examiner

*Primary Examiner* — Mark A Deuble
(74) *Attorney, Agent, or Firm* — Tutunjian & Bitetto, P.C.

(57) ABSTRACT

A mounting arrangement, for securing a protective component to a chute or conveyor structure, having a hook-shaped formation which engages with the protective component, a first beaded section located in a first undercut slot in a supporting base, and a retaining mechanism which abuts a side of the first beaded section and which has a second beaded section located in a second undercut slot in the base.

8 Claims, 3 Drawing Sheets

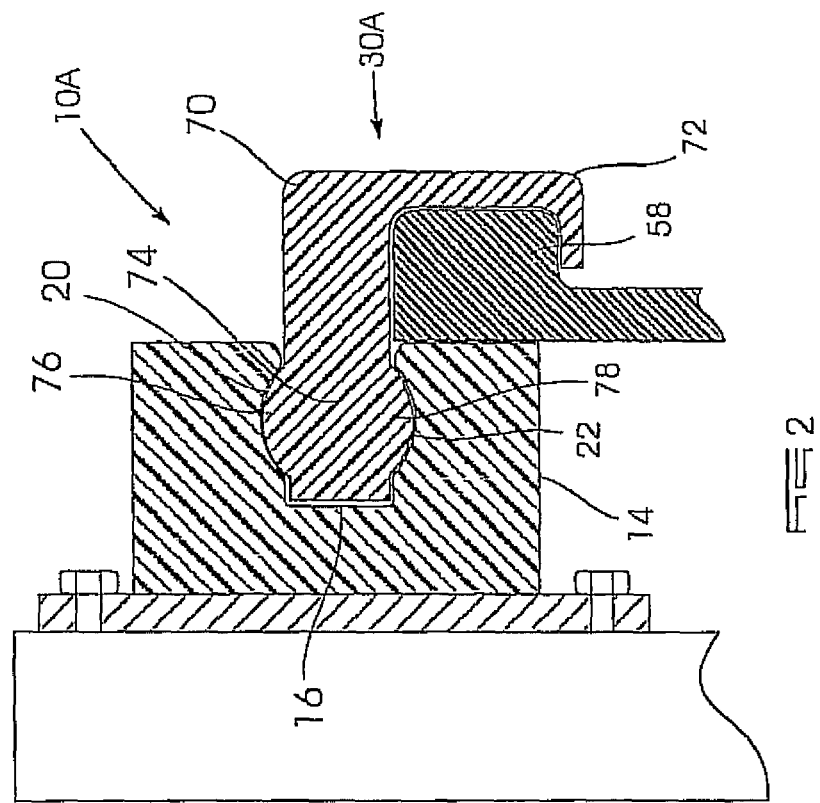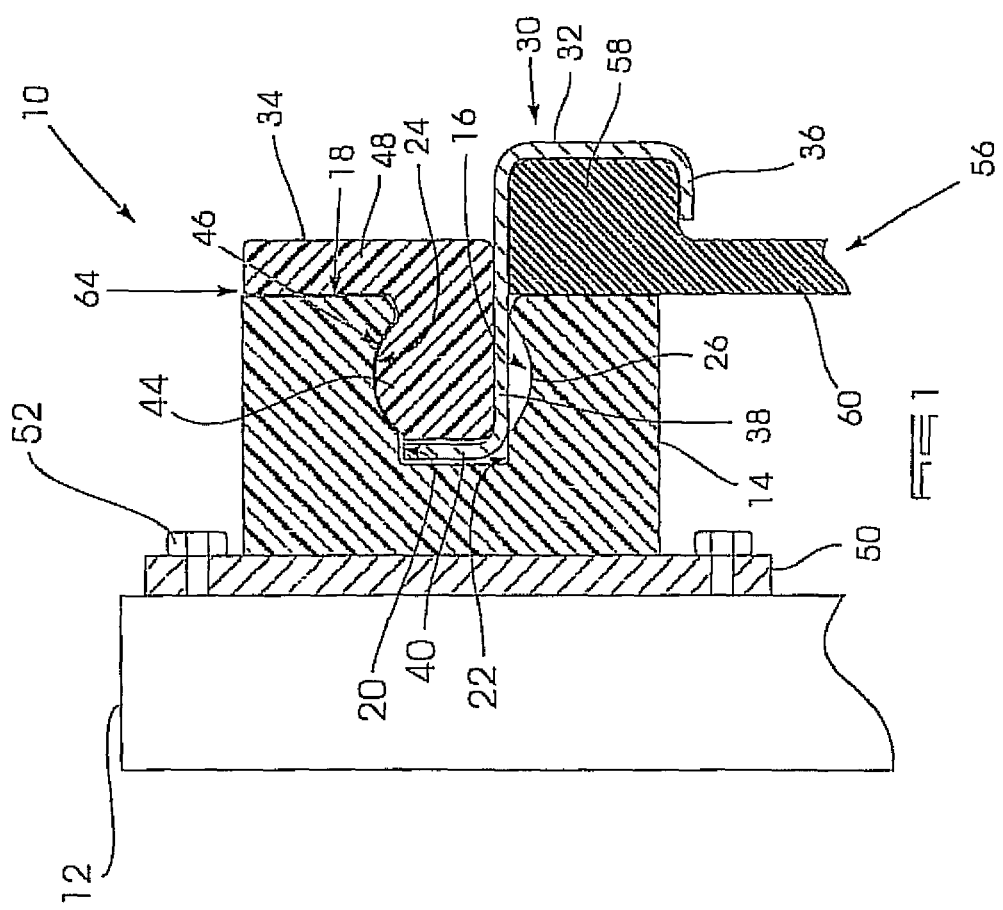

MOUNTING ARRANGEMENT

BACKGROUND OF THE INVENTION

This invention relates generally to a protective and containment component suitable for use as a liner or skirt in a conveyor system e.g. at a chute or belt, and more particularly is concerned with an arrangement for mounting a component of the aforementioned kind.

When a particulate material such as ore or coal or the like is conveyed on a conveyor belt there can be a tendency under certain conditions for the material, fines and dust to roll and escape off the belt. This undesirable feature can be countered, to a considerable extent, by using containment skirts, which are made from a suitable abrasion resistant material such as rubber, adjacent longitudinal edges of the conveyor belt. The skirts prevent the particulate material from escaping from the belt and ensure that substantially all of the material remains on the belt.

A similar process takes place in a discharge chute through which particulate material is directed from a source onto an underlying conveyor belt. In order to protect the sides of the chute protective liners are positioned inside the chute.

In each of the aforementioned cases the skirt or liner, as the case may be, is made from an abrasion-resistant material such as rubber. This material, suitably shaped, must be attached to supporting structure in an effective manner. The use of bolts or similar fasteners can be a tedious and cumbersome process and, if the liners of skirts have to be replaced due to wear and tear, the removal of this type of fastener can be time-consuming and difficult particularly when the effects of corrosion and impact damage, due to the particulate material, have made themselves felt.

The invention is concerned with a mounting arrangement which can be used in the aforementioned situation and which can reduce or eliminate the need for metal fasteners.

SUMMARY OF INVENTION

The invention provides a mounting arrangement for a protective and containment component which includes an elongate rib and an elongate body which extends from the rib, the mounting arrangement including an elongate base which is made from a resiliently deformable material and which is formed with an elongate slot with at least a first undercut formation, the base, in use, being attached to a support structure, and a retaining mechanism which includes a first formation which is engageable with the rib, and a second formation which is insertable into the slot and which is engageable with the first undercut formation, thereby to secure the rib to the base.

In one form of the invention the retaining mechanism includes a first component which carries the first formation and a portion of the first component extends into the slot, and a second component which carries the second formation and which is engageable with the first component thereby to clamp the rib to the base.

The first formation may be hook-shaped and the first component may include a flange which is located in the slot and against which the second component bears. The first component may be made from a metallic sheet material.

In a variation the second component is shaped to engage with a second undercut formation in the slot which, preferably, opposes the first undercut formation.

In a second form of the invention the retaining mechanism comprises a single element which includes the first formation and the second formation. Preferably, the first formation is hook-shaped.

The second formation may be of complementary shape to the undercut formation.

The base may be formed with opposing first and second undercut formations on opposing inner surfaces of the slot.

BRIEF DESCRIPTION OF THE DRAWINGS

The invention is further described by way of examples with reference to the accompanying drawings in which:

FIG. 1 is a side view in cross section of a mounting arrangement according to a first form of the invention;

FIG. 2 is a view similar to FIG. 1 of a mounting arrangement according to a second form of the invention;

DESCRIPTION OF PREFERRED EMBODIMENTS

FIG. 1 of the accompanying drawings illustrates in cross section a mounting arrangement 10 according to a first form of the invention engaged with a frame member 12 of support structure (not shown).

Figure 4:
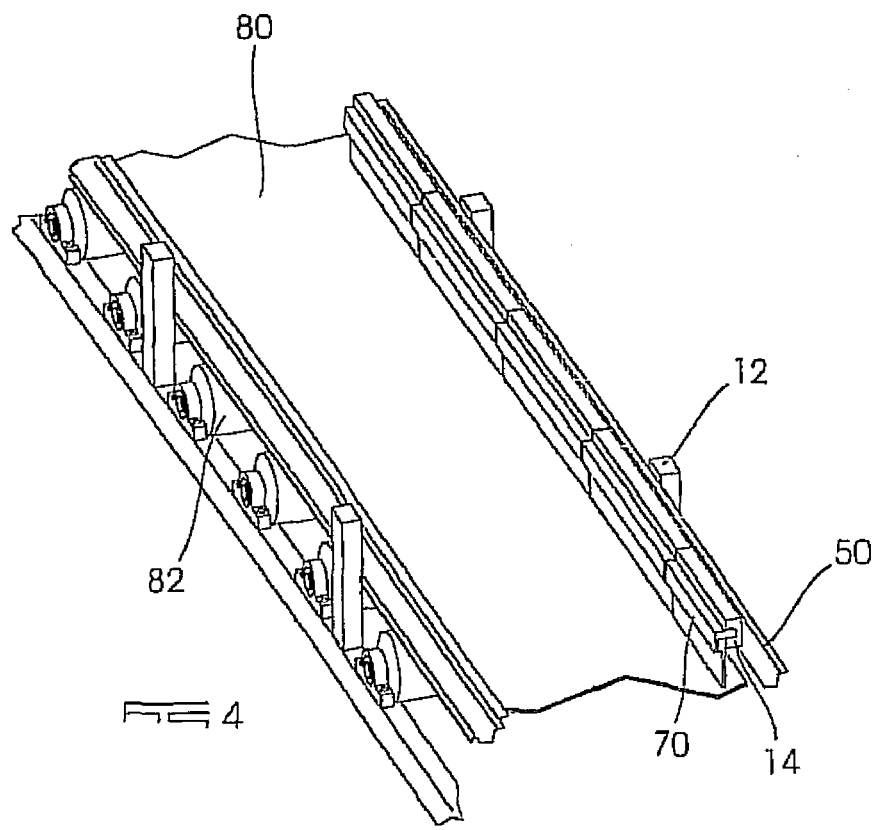
FIG. 4 shows a conveyor belt installation which makes use of the mounting arrangement.
Figure 5:
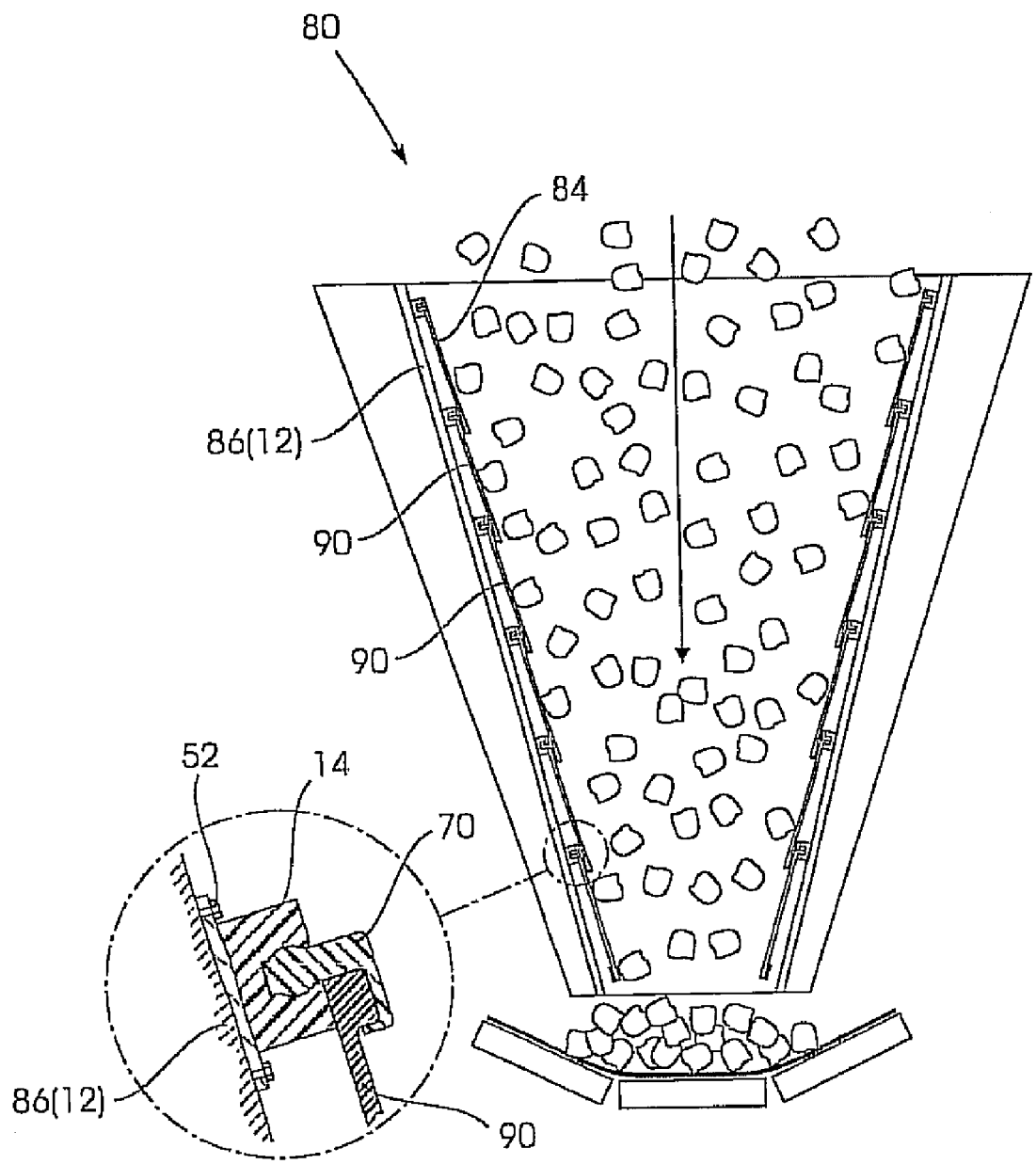
FIG. 5 shows an installation on a chute which makes use of the mounting arrangement.

The mounting arrangement of the invention can be used with a protective component such as a liner for a chute—see FIG. 5, or the like, or a containment component such as a containment skirt for a conveyor belt or the like—see FIG. 4. The application of the invention is not limited in this respect. More particularly the phrase "protective and containment component" is not limited to skirts and liners of the aforementioned kind and includes other protective or containment components.

The frame member 12 in FIG. 1 can thus be a side of a chute, supporting structure attached to a conveyor belt, or the like. The invention is not limited in this regard.

The mounting arrangement 10 includes an elongate base 14 which is made from a resiliently-deformable, hardwearing material such as polyurethane of an appropriate hardness. The base is formed with an elongate slot 16 which extends in the longitudinal direction of the base and which is centrally positioned in a side 18 of the base.

The slot has an inner, upper surface 20 and an opposing lower, inner surface 22. Each surface is formed with a respective elongate undercut formation 24 and 26. Each formation, in cross section, has a gentle concave shape.

The mounting arrangement includes a retaining mechanism 30 which, in this example, includes a first element 32 and a second element 34. The first element is made from sheet material e.g. steel, and has a first, hook-shaped formation 36, an inwardly extending planar section 38 and an upstanding flange 40 along one edge of the planar section. The second element 34 preferably made from the same material as the base 14 i.e. a tough polyurethane material. The element includes a beaded section 44 which has an upper profile 46 which is similar to the concave undercut formation 24 and a side flange 48.

The base 14 is attached, e.g. by bonding or by using an adhesive, to a metallic plate 50 which is secured by means of bolts 52 or other fasteners, or by means of welding, to an inner surface of the frame member 12.

The components described thus far are intended to be used with a protective liner or skirt 56, part of which is shown in cross section. The liner or skirt, referred to hereinafter as a "protective member", includes an elongate rib 58 which is generally rectangular in profile and an elongate body 60 which extends from the rib. The shape and size of the rib, and of the body, can vary according to requirement and, generally, are determined by installation conditions. The scope of the invention is not limited in this regard.

The rib 58 is substantially complementary in shape to the hook-shaped formation 36 on the first element 30. The hook-shaped formation is first engaged with the rib, and the flange 40 is then inserted into the slot 16 to abut a side wall of the slot. Thereafter the beaded section 44 is placed on top of the planar section 38 and a hammer or similar appliance (not shown) is used to knock the beaded section deep into the slot so that the upper profile 46 of the beaded section engages with, and nestles closely inside, the concave undercut formation 24. The relatively large rib 42 is thereby brought into close abutment with an upper portion of the side 18. The hook-shaped formation 36 securely grips the rib 58 and urges the rib towards the lower part of the side 18 and, in so doing, the rib is firmly clamped to the base 14.

When the beaded section is driven into the slot the base 14, which is capable of resilient deformation, at least to a limited extent, can flex and bend so that the beaded section can enter the undercut formation 24. Once this occurs the base reverts automatically to its original cross sectional shape and the protective member 56 is thereby securely attached to the base. This is achieved without the use of screw threaded fasteners or similar components.

At any time if it is required to remove the protective member 56, e.g. for repair, maintenance or replacement purposes, then by using a suitable tool such as a flat plate or screwdriver which is inserted into a gap 64 between opposing surfaces of the base 14 and the rib 48, it is possible to deform the base 14 and then to pull the second element 34 from the slot. Once the various components which are worn or damaged have been replaced, the procedure which has been described can again be adopted to secure a fresh protective member to the base.

FIG. 2 shows a mounting arrangement 10A according to a second form of the invention which bears many similarities to the arrangement shown in FIG. 1. Components in FIG. 2 which are the same as, or which are similar to, corresponding components shown in FIG. 1 bear like reference numerals and are not further described herein.

The retaining mechanism in FIG. 2 is designated 30A and is of integral construction and does not include two elements as is the case in the arrangement shown in FIG. 1.

The retaining mechanism 30A includes an elongate body 70 with a hook-shaped, first formation 72 which is of complementary shape to the rib 58 and a second formation 74 which is insertable into the undercut slot 16 in the base 14. The second formation 74 has opposed upper and lower beads 76 and 78 respectively which conform in shape and size to the concave, undercut formations 20 and 22 in the slot 16.

The body 70 is made from a tough, wear-resistant, plastics material such a polyurethane which may for example be of the same grade as the polyurethane from which the base 14 is made.

Once the first formation 72 is engaged with the rib 58, the second formation 74 is pushed slightly into the slot 16 and is then forced deeper into the slot, by using a hammer or similar implement, so that the beaded formations are respectively engaged in, and nestle closely inside, the formations 20 and 22. This is achieved, through the application of sufficient force, by causing the upper and lower portions of the base 14 to deform outwardly so that a mouth of the slot is enlarged sufficiently to allow the beaded sections to enter the slot and engage with the undercut formations.

An advantage of the arrangement shown in FIG. 2 is that the mounting mechanism 30A comprises a single component. A further benefit is that the retaining mechanism does not include any metallic constituents and thus, inherently, is corrosion resistant.

Figure 3:
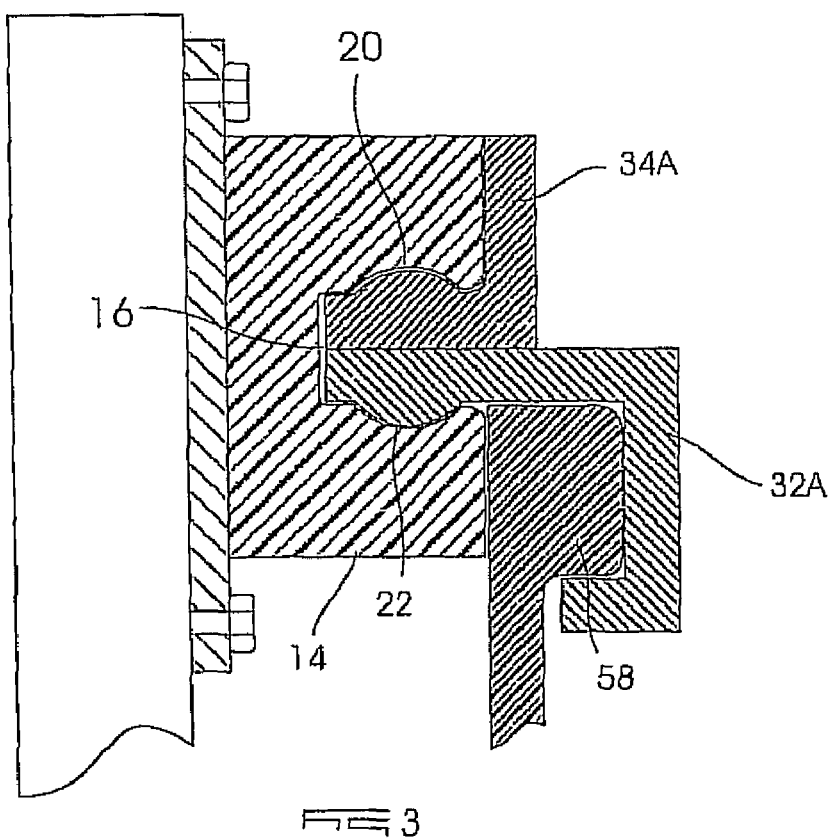
FIG. 3 shows another mounting arrangement.

FIG. 3 shows another retaining mechanism which is based on features selected from the arrangement in FIGS. 1 and 2. A hook-shaped formation 32A is closely engaged with the rib 50 of the protective component. A beaded section 78, on a planar section 38 which projects from the formation 32A, is located in a concave, undercut formation 26 in a lower surface 22 of the slot. An element 34A which is made from polyurethane, and which is similar to the element 34 shown in FIG. 1, has a beaded section 44 which is engaged closely with a complementary concave undercut formation 24 in the upper surface 20 of the slot. A surface of the beaded section abuts a side of the first beaded section. In this way the protective component is securely attached to the base 14 but in a manner which enables detachment to take place, easily and rapidly, when required for repair or replacement purposes.

FIG. 4 shows part of a conveyor belt 80 which runs on rollers 82. Frame members 12 extend upwardly on opposed sides of the belt and the plates 50 are secured to the frame members.

As is shown in FIG. 5 a similar approach is adopted to secure a protective lining 84 to sides 86 of a chute 88. Each lining comprises a plurality of liners 90, and each liner is attached, in the manner which has been described, so that successive liners slightly overlie one another. Each side 86 thus takes the place of, or is treated as, a frame member 12.

What is claimed is:

1. A mounting arrangement for a protective and containment component which includes an elongate rib and an elongate body which extends from the rib, the mounting arrangement comprising: an elongate base made from a resiliently deformable material and formed with an elongate slot with at least a first undercut formation, the elongate base, in use, being attached to a support structure; and a retaining mechanism having a first formation engageable with the rib, and a second formation insertable into the slot and which is engageable with the first undercut formation, to thereby secure the rib to the base.

2. The mounting arrangement according to claim 1 wherein the retaining mechanism further comprises: a first component which carries the first formation and wherein a portion of the first component extends into the slot; and a second component which carries the second formation and which is engageable with the first component to thereby clamp the rib to the base.

3. The mounting arrangement according to claim 2 wherein the first formation is hook-shaped and the first component comprises a flange which is located in the slot and against which the second component bears.

4. The mounting arrangement according to claim 2 wherein the first formation is hook-shaped and the second component is shaped to engage with a second, undercut formation in the slot.

5. The mounting arrangement according to claim 4 wherein the second undercut formation opposes the first undercut formation.

6. The mounting arrangement according to claim 1 wherein the retaining mechanism comprises a single element which includes the first formation and the second formation.

7. The mounting arrangement according to any one of claim 1 wherein the second formation is engageable with the first undercut formation by resiliently deforming the base.

8. A mounting arrangement, for securing a protective component to a chute or conveyor structure, the mounting arrangement comprising: a hook-shaped formation which engages with the protective component; a first beaded section located in a first undercut slot in a supporting base; and a retaining mechanism abutting a side of the first beaded section and having a second beaded section located in a second undercut slot in the base.

* * * * *